May 23, 1939.   G. W. TODD   2,159,460
TRACTOR HITCH
Filed July 27, 1938   2 Sheets-Sheet 1
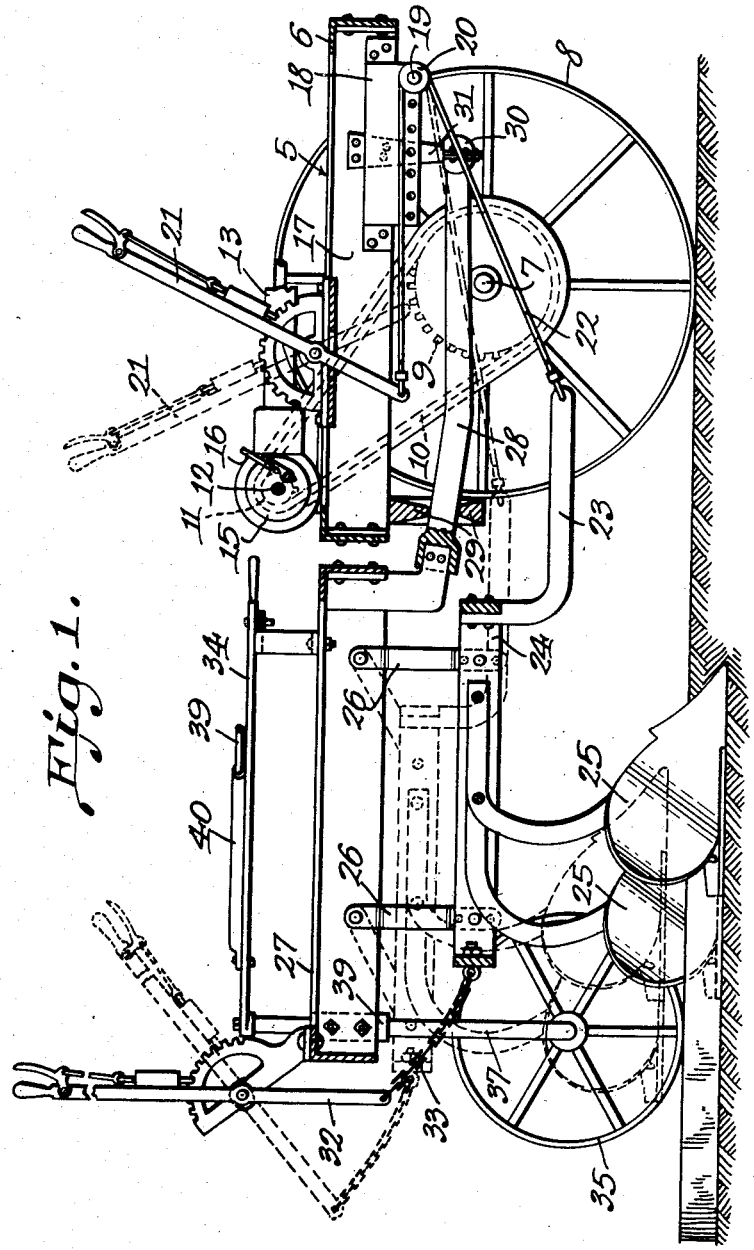
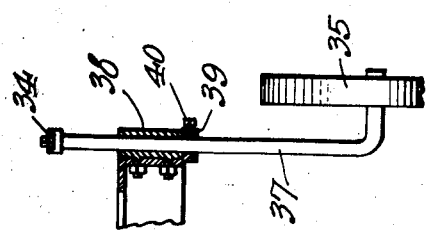
Garry W. Todd
INVENTOR.
BY
ATTORNEYS.

May 23, 1939. G. W. TODD 2,159,460
TRACTOR HITCH
Filed July 27, 1938 2 Sheets-Sheet 2
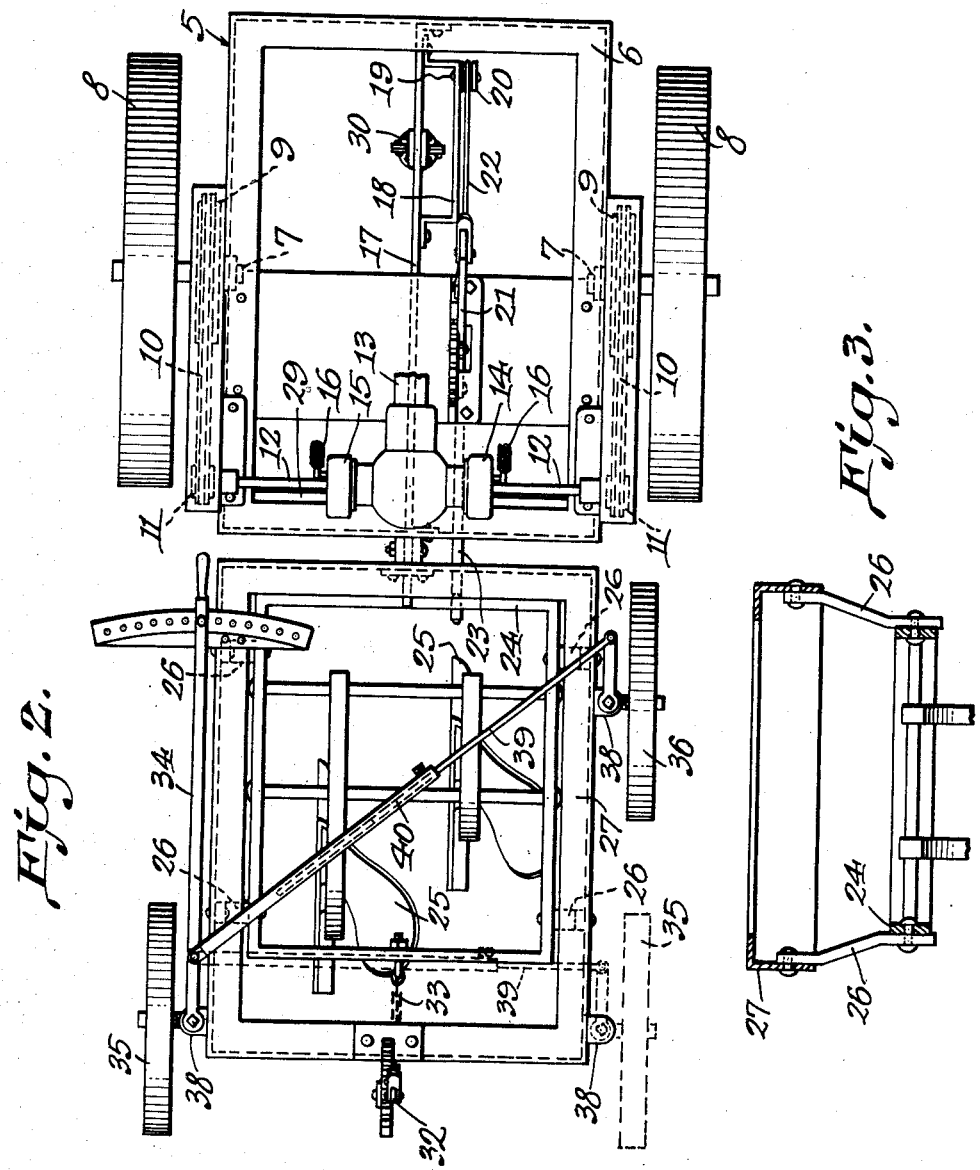
Garry W. Todd
INVENTOR.
BY Ch Snowles
ATTORNEYS.

Patented May 23, 1939

2,159,460

UNITED STATES PATENT OFFICE 2,159,460

TRACTOR HITCH

Garry W. Todd, Charlotte, N. C.

Application July 27, 1938, Serial No. 221,619

5 Claims. (Cl. 97—232)

This invention relates to a tractor drawn plow, and more particularly to the hitch used in connecting the tractor to the plow, the primary object of the invention being to provide means for hitching a plow to a tractor in such a way that the weight of the load is balanced at all times, due to equalizing the engine torque and draft load.

An object of the invention is to provide a wheel-supported plow frame in which the plows are pivotally mounted, means being provided for adjusting the plows in such a way that when the adjusting chains thereof have been slackened, and the plows move rearwardly the plows will run out of the ground, eliminating the necessity of the operator lifting the plows to their inactive positions.

An important object of the invention is to provide a hitch which will have a connection with the tractor in such a way that the torque load is behind the pivot point and draft load is ahead of the pivot point, thereby equalizing the engine torque by the draft load which holds the deadweight balanced.

A further object of the invention is to increase the dead-weight by directing the draft load to the point of contact between the tractor wheels and ground surface.

A still further object of the invention is to provide means whereby the hitch may be adjusted with respect to the tractor, thereby adapting the device for use under various ground conditions.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawings:

Figure 1 is a longitudinal sectional view through a tractor and plow, constructed in accordance with the invention.

Figure 2 is a plan view thereof.

Figure 3 is a transverse sectional view through the main plow frame and auxiliary pivoted plow frame connected therewith.

Figure 4 is an enlarged detail view illustrating the adjustable connection between the supporting wheels and main plow frame.

Referring to the drawings in detail, the reference character 5 designates a tractor which is of the sulky type, the tractor including a frame 6, which is provided with bearings in which the axle 7 is mounted.

Wheels 8 are mounted on the axle 7, the wheels 8 being provided with sprockets 9 over which the chains 10 operate, the chains also moving over the substantially small sprockets 11 mounted on the outer ends of the shafts 12 that in turn are operated by a suitable engine mounted on the tractor, and not shown in the present drawings. The shafts 12 receive motion from the propeller shaft 13 through the clutches 14 and 15 that are operated by means of the foot pedals 16 disposed adjacent to the operator's seat for ready access by the operator.

The reference character 17 indicates a central bar disposed longitudinally of the frame 6, which bar provides a support for the plate 18 that is formed with a plurality of spaced openings to receive the shaft 19 on which the pulley 20 is mounted. Thus it will be seen that due to this construction, the shaft 19 may be adjusted longitudinally of the plate 18 to adjust the position of the shaft 19 and pulley 20, for purposes to be hereinafter more fully described.

Mounted on the tractor frame, is a lever 21 that has its lower end extended below the lower edges of the frame 6, where it is formed with an opening to which one end of the cable 22 is connected. This cable 22 passes over the pulley 20 and has connection with the forwardly extended bar 23 of the vertically movable plow frame 24. Due to this construction, it will be seen that movement of the lever 21 will result in a movement of the bar 23, adjusting the vertically movable plow frame with respect to the tractor. Plows 25 are carried on the vertically movable plow frame 24. Links 26 connect the vertically movable plow frame 24 with the main plow frame 27, which is wheel-supported, the main plow frame being connected to the tractor frame, by means of the hitch bar 28 that extends between the spaced bar 29, the forward end of the hitch bar 28 being connected with the tractor frame, by means of the ball and socket connection 30, disposed at the lower end of the bracket 31.

Mounted on the main plow frame is a lever 32 to which the chain 33 is connected, the chain 33 being connected with the vertically movable plow frame 24, so that by movement of the lever 32, the vertically movable plow frame 24 may be adjusted to regulate the depth of operation of the plows 25 which are carried thereby.

The main plow frame 27 is supported by means of the rear wheels 35 and a forward wheel 36, the wheels being mounted at the lower ends of the vertical shafts 37 that are adjustable vertically through the bearings 38 carried by the main plow frame, by means of the collars 39 which are held in position on the shafts 37, by means of the set screws 40.

The vertical shafts on which the forward wheel 36 and one of the rear wheels 35 are supported, are connected with the control lever 34 by means of the adjustable rods 39 and 40. Due to this construction, it will be seen that as the control lever 34 is moved to the right or left, the supporting wheels of the main plow frame will be moved to guide the main plow frame. When it is desired to guide the tractor, this is accomplished by throwing in one of the clutches 15 or 16, according to the direction to be traveled, and throwing out the opposite clutch member.

From the foregoing it will be seen that due to the construction shown and described, the draft load is ahead of the pivot, and the torque load or pull directed to the tractor wheels by the engine, is behind the pivot point to the end that the engine torque is equalized by the draft load, directing excessive pressure to the ground surface, at the point of contact between the tractor wheels and ground surface. It follows that excessive strain directed to the tractor, due to the plows striking an obstruction, will operate to increase the dead-weight of the tractor, and insure against the tractor rearing or the tractor wheels slipping over the ground surface.

I claim:

1. The combination with a tractor of the sulky type, of a wheel-supported main plow frame, a draw-bar connected with the main plow frame, means for pivotally connecting the draw-bar to the tractor at a point in advance of the axle of the tractor, a vertically adjustable plow carrying frame mounted on the main plow frame, an arm extending forwardly from the vertically adjustable frame, and a flexible member connecting the arm to the tractor at a point in advance of the axle of the tractor and also in advance of the point of connection between the draw-bar and tractor.

2. The combination with a tractor of the sulky type, of a wheel-supported main plow frame, a draw-bar connected with the plow frame, means for pivotally connecting the draw-bar to the tractor at a point in advance of the axle and spaced from the forward end of the tractor, a vertically adjustable plow carrying frame mounted on the main plow frame, an arm extending forwardly from the vertically adjustable frame, said arm terminating in spaced relation with the axle of the tractor and at the rear of the axle of the tractor, and a flexible member connected to the arm and having connection with the tractor at a point in advance of the axle of the tractor and also in advance of the point of connection between the draw-bar and tractor.

3. The combination with a tractor of the sulky type, of a wheel-supported main plow frame, a draw-bar connected with the plow frame, means for pivotally connecting the draw-bar to the tractor at a point in advance of the axle of the tractor, a vertically adjustable plow carrying frame mounted on the main plow frame, means for adjusting the vertically adjustable plow carrying frame with respect to the main plow frame, an arm extending forwardly from the vertically adjustable frame, a pulley mounted on the tractor frame in advance of the connecting point between the draw-bar and tractor frame, and a flexible member connecting the arm to the tractor, said flexible member passing over the pulley and having one end thereof adjustably secured to the tractor.

4. The combination with a tractor of the sulky type, of a wheel-supported main plow frame, a draw-bar connected with the plow frame, means for pivotally connecting the draw-bar to the tractor at a point in advance of the axle of the tractor, a vertically adjustable plow carrying frame mounted on the main frame, an arm extending forwardly from the vertically adjustable frame and terminating in spaced relation with the axle of the tractor, at the rear of the axle, a flexible member connected with the forward end of the arm, a pulley adjustably mounted on the tractor in advance of the axle and over which the flexible member moves, an adjusting lever to which one end of the flexible member is connected whereby the length of the flexible member may be adjusted, and means for adjusting the vertically adjustable frame.

5. The combination with a tractor of the sulky type, of a wheel-supported main plow frame, a draw-bar connected with the main plow frame, means for pivotally connecting the draw-bar to the tractor at a point in advance of the axle of the tractor, a vertically adjustable plow carrying frame mounted on the main plow frame, an arm extending forwardly from the vertically adjustable plow carrying frame, a bar mounted on the tractor in advance of the axle of the tractor, said bar having a plurality of spaced openings, a pulley adjustably mounted within the openings, a flexible member connected with the forward end of the arm and movable over the pulley, a pivoted lever to which the opposite end of the flexible member is connected, whereby the flexible member may be adjusted, and means for raising the vertically adjustable plow carrying frame.

GARRY W. TODD.